United States Patent [19]

Reitemeyer et al.

[11] 4,137,028
[45] Jan. 30, 1979

[54] APPARATUS FOR THE EXTRUSION OF TUBULAR BODIES OF SYNTHETIC-RESIN MATERIAL

[75] Inventors: Paul Reitemeyer, Troisdorf-Bergheim; Franz J. Kupper, Bensberg, both of Germany

[73] Assignee: Reifenhäuser KG, Troisdorf, Germany

[21] Appl. No.: 871,993

[22] Filed: Jan. 24, 1978

[30] Foreign Application Priority Data

Feb. 12, 1977 [DE] Fed. Rep. of Germany ....... 2706085

[51] Int. Cl.² .............................................. B29F 3/04
[52] U.S. Cl. .................................... 425/141; 264/40.1; 264/209; 425/145; 425/381; 425/404; 425/466
[58] Field of Search ............ 235/151.1, 151.13, 151.3; 425/145, 404, 445, 325, 380, 467, 141, 381, 466; 264/209, 40.1, 40.2; 72/264

[56] References Cited

U.S. PATENT DOCUMENTS

| 3,782,873 | 1/1974 | Lynnknowles | 425/141 |
| 3,940,221 | 2/1976 | Nissel | 425/141 |

FOREIGN PATENT DOCUMENTS

2505221  8/1976  Fed. Rep. of Germany ........... 425/141

Primary Examiner—Richard B. Lazarus
Assistant Examiner—Mark Rosenbaum
Attorney, Agent, or Firm—Karl F. Ross

[57] ABSTRACT

An apparatus for the extrusion of tubular bodies of synthetic-resin material and especially large-diameter pipes, in which the die for forming the tube is connected to an extrusion press and includes an outer member and an inner member between which the material is forced. On the outer member there is provided a calibrating sleeve and the die carries a radioactive thickness-measuring means.

10 Claims, 4 Drawing Figures

APPARATUS FOR THE EXTRUSION OF TUBULAR BODIES OF SYNTHETIC-RESIN MATERIAL

FIELD OF THE INVENTION

The present invention relates to the extrusion of tubular bodies and, more particularly, the manufacture of large-caliber or large-diameter pipe from thermoplastic synthetic-resin material by an extrusion process.

BACKGROUND OF THE INVENTION

In the formation by extrusion of tubular bodies, e.g. large-caliber pipe, from a thermoplastic synthetic-resin material, the synthetic-resin material is transformed into a thermoplastified state in a masticating and plastifying unit operating with one or more worms and forcing the material continuously out of the discharge end of this unit. The unit is generally referred to as an extrusion press and, at the mouth thereof, is provided with the shaping tool or extrusion die which imparts the desired configuration to the tubular body which is to be produced.

The extrusion die, which is connected to the discharge head of the press generally comprises an outer tool or member, usually in the form of a sleeve, and an inner tool or member, usually in the form of a mandrel around which the synthetic-resin material is forced.

To establish the outer diameter of the extruded strand or tube, the outer member of the die can have connected thereto a so-called calibrating sleeve which can engage the outer surface of the extruded body and in part the desired external diameter thereto. The calibrating sleeve may be cooled so that the extruded tube is at least partially hardened by the calibrating process.

It is also known to provide such apparatus with a thickness-measuring device utilizing radioactive material or, more generally, a radioactive source disposed on one side of the pipe wall and a radiation detector disposed on the opposite side of this pipe wall.

The outer member of the die may consist, in turn, of a plurality of parts and, in general, these include a fixed outer tool part and an adjustable outer tool part, the adjustable outer tool part being shiftable relative to the mandrel or inner tool part by at least three angularly equispaced adjusting screws.

A wall thickness-measuring device of the type mentioned previously can constitute means for determining whether the tube wall is of constant thickness over the entire periphery or circumference of the tube and/or merely the thickness of the tube at a given point.

With the aid of the centering-screw arrangement, the adjustable outer tool part can be shifted relative to the inner tool so that a uniform wall thickness is maintained around the entire periphery of the extruded product.

By controlling the rate at which the synthetic-resin material is fed into the die by the extrusion press and the rate at which the extrusion tube is withdrawn from the die, the mass flow can be controlled to establish the wall thickness per se.

In conventional apparatus of the aforedescribed type, the wall-thickness measuring device is not integrated with the extrusion die and is usually not even connected thereto. It is customary to provide the thickness-measuring device as an independent unit disposed downstream of the die and even downstream of the cooling stretch along which the tube passes. The radioactive thickness detector thus operates on an already hardened tube.

Thickness measurement is effected by detecting transmitted radioactivity or by detecting back-scattered radioactivity and in the latter case the detection head is disposed externally of the extruded tube. In practice, the irradiating and back-scatter detection means thus encircle the extruded pipe.

The conventional apparatus can only be used with hardened extruding pipes because the apparatus which must encircle the same is guided upon rollers which engage the outer periphery of the tube and would distort the latter if it was insufficiently hardened or still somewhat plastic.

The prior-art system thus provides a considerable stretch between the extrusion die and the measuring device and, at high production rates, a considerable length of extruded tube can be produced between the detection of an irregularity by the thickness-measuring system and a correction at the extrusion head. Once a correction is made at the extrusion die or tool, it is not detected until the modified tube portion reaches the thickness-measuring device. Thus there is a considerable dead time in the control of the thickness of the pipe which has been found to be especially disadvantageous when large diameter tubes are produced.

As a result of this dead time, there cannot be an immediate response to the generation of control signals. The pipe which is produced may have detrimental deviation from the desired tolerances and hence relatively large dimensional variations. Finally, large segments of pipe may be unusable.

It has been found to be technically very costly and difficult to provide separate signals for an automatic centering of the tube head in response to thickness differences around the periphery of the tube and for affecting the output of the extrusion press and/or the tube withdrawal device to thereby control the overall thickness. In practice such withdrawal-speed controllers which regulate the total mass flow of the synthetic-resin material per unit time and therefore the wall thickness and which must be responsive to a corresponding setpoint value, is very expensive and does not always operate satisfactorily.

OBJECTS OF THE INVENTION

It is the principal object of the present invention to provide an improved thickness-detection system for a tube-extrusion apparatus whereby the aforementioned disadvantages are obviated.

It is another object of this invention to provide an improved apparatus for the extrusion of tubes of synthetic-resin material which can maintain the thickness tolerances of the product within narrow limits around the periphery thereof as well as over the length of tube produced.

SUMMARY OF THE INVENTION

These objects and others which will become apparent hereinafter are attained, in accordance with the present invention, by connecting the radiation source coaxially and centrally to the inner tool member or mandrel of the die, this radiation source reaching axially away from the outlet of the die into a region within the calibration sleeve which surrounds the tube directly adjacent the die and connected therewith. Radiation detector means is provided around the periphery of the tube in the same transverse plane as the radiation source and advantageously includes one or more radiation detectors disposed around the periphery of the calibrating sleeve. The calibrating sleeve can be formed with windows through which the radiation passes after traversing the wall of the tube.

The output of the detectors can be used as setpoint values for the peripheral wall thickness correction and in this case, the detectors are connected to a control circuit which operates the centering screws. In addition, the outputs of the detectors can be combined and used to control a mass-flow regulator for the speed of the extrusion press and/or the withdrawal speed of the withdrawing device. It has been found to be advantageous, furthermore, to connect the detectors to the fixed tool part of the die by a support which reaches over the movable or adjustable tool part and positions the detectors in radial juxtaposition to the radiation source.

It has been found to be advantageous, furthermore, to provide the radiation source within a shield, e.g. a sleeve, and to form this sleeve with means for axially displacing the source into a position in which the source is juxtaposed radially with the detectors. In another position, the radiation source is withdrawn within the sleeve so that little if any radiation can escape therefrom. The sleeve may be provided with radial windows respectively aligned with the detectors and can be constituted as a cylinder whose piston carries the radiation source.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
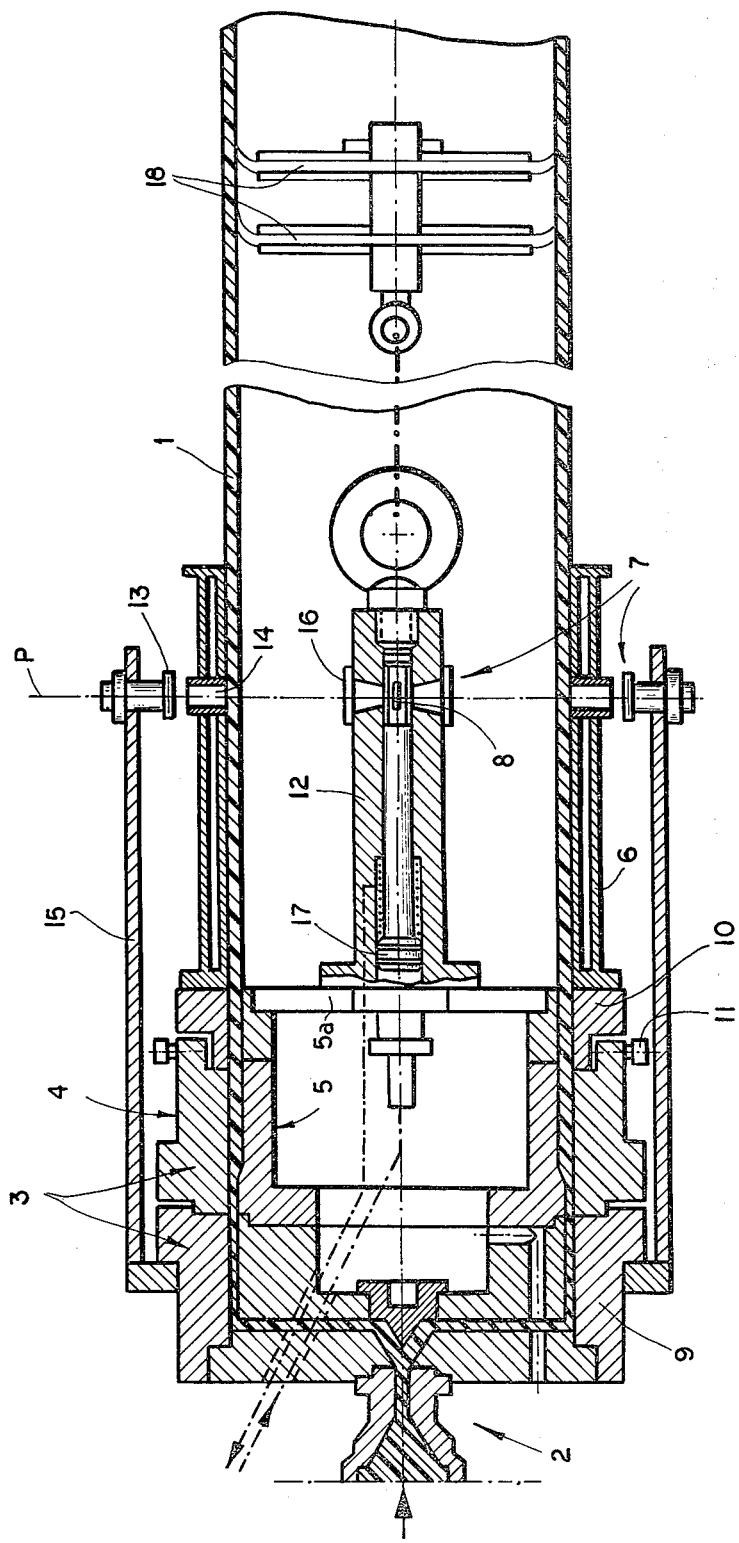
FIG. 1 is an axial cross-sectional view through an apparatus embodying the invention.
Figure 3:
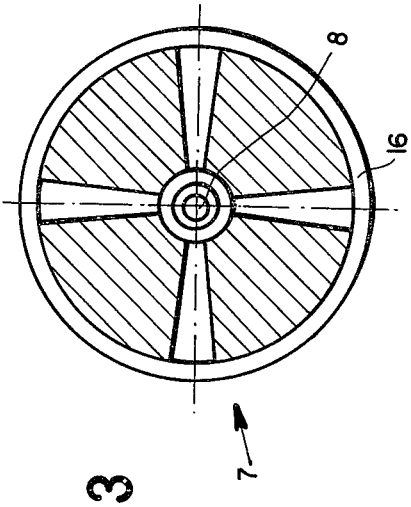
FIG. 3 is a cross-sectional view taken along the line III — III of FIG. 2.

The drawing illustrates an apparatus for the extrusion of synthetic-resin tubes 1, usually large-caliber pipe of thermoplastic material which is thermoplastified in an extrusion press whose head 2 feeds the die which has been represented at 3.

The die 3 comprises a sleeve-shaped outer tool 9 and a mandrel-forming inner tool 5 between which the extruded material is forced. The outer tool 4 also carries a calibrating sleeve 6 which can be cooled or internally perforated and connected with a suction source, in accordance with conventional principles, to establish definitively the outer diameter of the pipe.

The apparatus also comprises a wall-thickness measuring device 7 including an isotope radiation source 8. The outer tool 4 comprises a fixed portion 9 and an adjustable part 10 which is capable of displacement radially on the fixed part by at least three angularly equispaced centering screws 11. The screws 11 thus displace the outer tool part 10 relative to the mandrel 5.

As will be apparent from FIG. 1, the isotope source 8 is received in a cylinder-forming axially extending holder 12 which is secured to the mandrel 5, e.g. by a spider 5a. The holder 12 is coaxial with this inner tool 5 and reaches with its free end to a plane P within the calibrating sleeve 6. Around the calibrating sleeve 6, there is disposed a plurality of angularly equispaced radiation detectors carried by brackets 15 reaching from the fixed part 9 of the outer member 4 of the die to the plane P. As a consequence, if the centering screws 11 are adjusted, there is no relative displacement between the holder 12 and the detectors 13.

Figure 2:
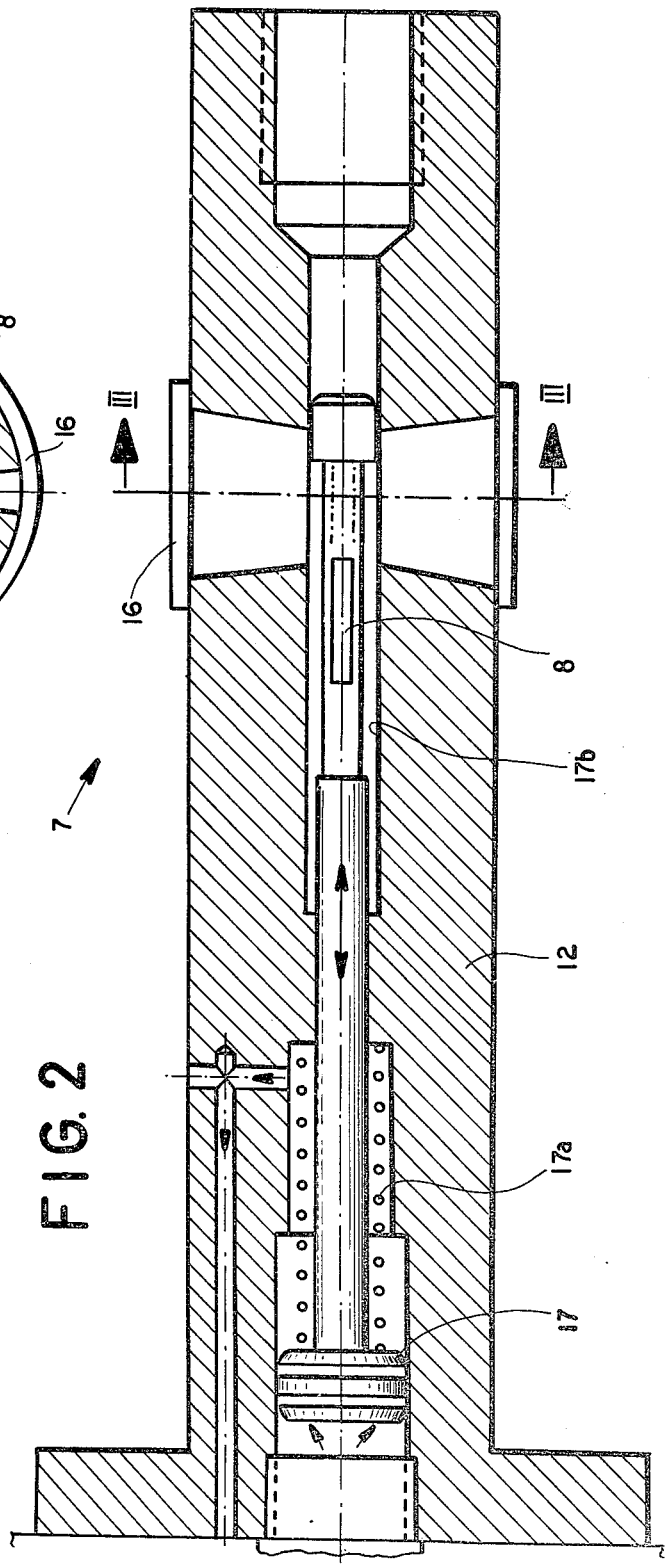
FIG. 2 is a detail view of the system for displacing the radiation source within its shield.

As can be seen from FIG. 2, the radiation source 8 can be shielded and, to this end, the holder 12 is formed as a shield sleeve which is provided with radially outwardly open radiation windows 16 in the plane P. A piston 17 is axially shiftable pneumatically or hydraulically against the force of a spring 17a to displace the radiation source 8 into alignment with the windows 16. This displacement can be carried out periodically or in accordance with any desired measurement program. When the source 8 is drawn from the window 16 into the narrow bore 17b of the sleeve 12, escape of the radiation is practically precluded.

The radiation holder 12 also serves as an anchor for a drag plug which maintains the pressure within the tube 1 in the calibration zone and prevents collapsing of the tube until it has sufficiently hardened.

Figure 4:
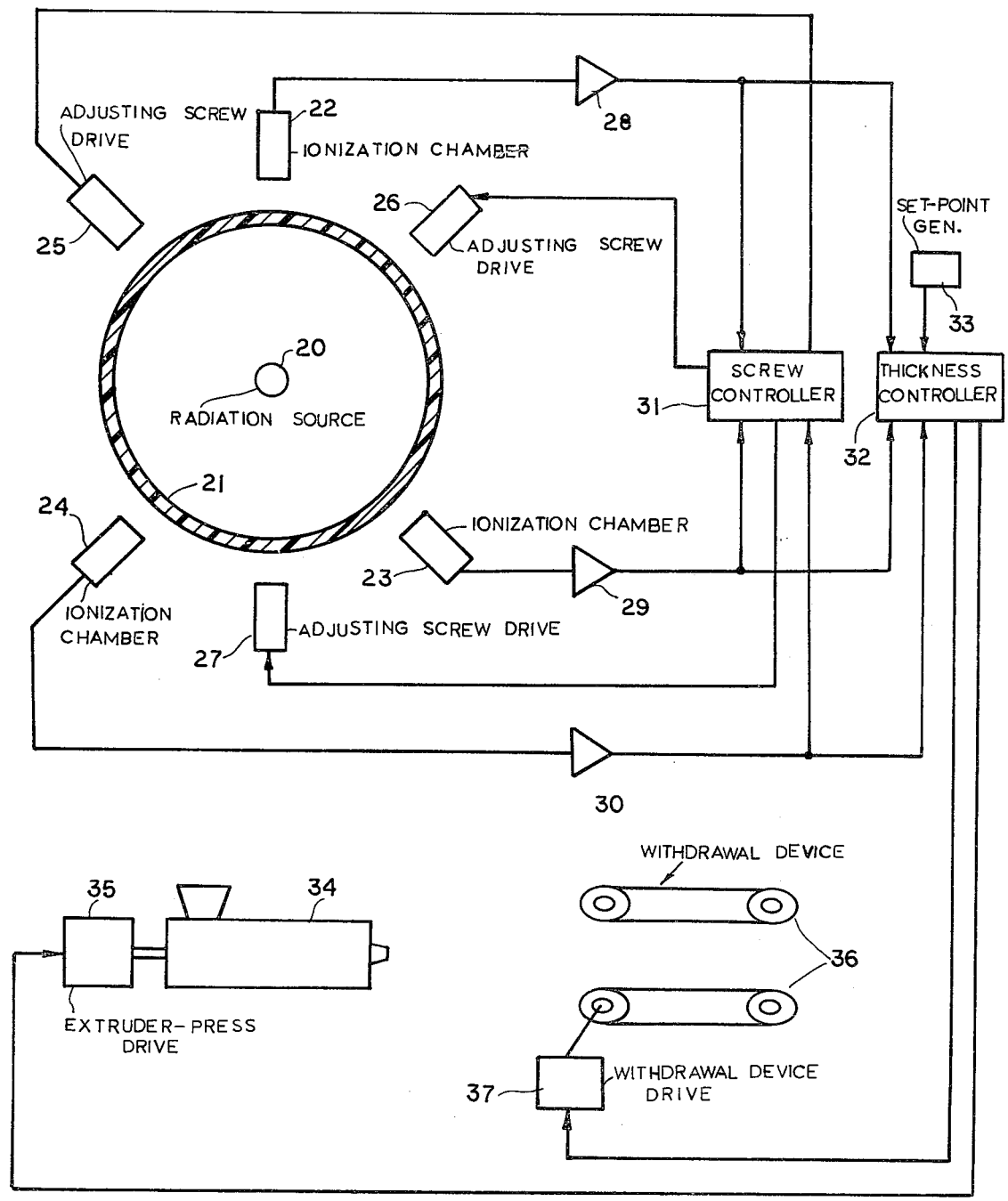
FIG. 4 is a block diagram illustrating principles of the present invention.

The detectors 13 are ionization chambers such as have been represented at 22—24 in FIG. 4 and can be connected by the usual amplifier circuits 28-30 to a centering screw controller 31, the output of which, in accordance with conventional seromechanisms mechanism practices, operates the adjusting screw drive servomotor 25-27 disposed around the pipe 21 in which the radiation source has been represented diagrammatically. The outputs of the ionization chambers can also be applied to a controller 32 for regulating the overall thickness of the pipe in accordance with the average values of the measured thicknesses, the setpoint generator 33 applying a corresponding setpoint value of the desired thickness. The thickness controller operates the extruder press drive 35 for the extruder 34 and the drive 37 for the withdrawal device 36, i.e. a pair of belts between which the cooled and hardened pipe is carried away.

The calibrating sleeve 6 is provided with radiation passing windows 14 respectively aligned with the windows 16 and the radiation detectors 13. Preferably the controller 31 effects a linear adjustment of the movable die part in response to the radiation detectors.

WE CLAIM:

1. An apparatus for the extrusion of tubular bodies, comprising an extrusion press having an outlet;
   a tube-forming die connected to said outlet and receiving thermoplastified material therefrom, the tubular body emerging from said die, said die having an inner member and an outer member shiftable relative to said inner member, said material being extruded between said members;
   a calibration sleeve connected to and extending axially from said die for imparting a given outer dimension to said body;
   a radiation source mounted on said inner member within said sleeve; and
   a plurality of radiation detectors mounted on said die and radially aligned with said radiation source, said radiation source and said detector constituting a thickness-measuring device for controlling the thickness of said body.

2. The apparatus defined in claim 1 wherein said outer member of said die includes a fixed part and a movable part, said movable part being displaceable relative to said inner member, said apparatus comprising adjusting means between said fixed and movable parts enabling such displacement of said movable part, said radiation detectors being mounted on said fixed part.

3. The apparatus defined in claim 2 wherein said sleeve is provided with respective openings aligned with said detectors through which radiation passes from said source through the wall of said body to said detectors.

4. The apparatus defined in claim 2, further comprising a holder coaxial with said inner member and mounted thereon, said holder being elongated and extending axially away from said die, said source being received in said holder.

5. The apparatus defined in claim 4 wherein said holder is formed as a radiation shield and has windows opposite said detectors, further comprising means in said holder for axially shifting said source into and out of registry with said windows.

6. The apparatus defined in claim 5 wherein said holder is formed as a fluid cylinder, the last-mentioned means including a piston axially displaceable in said cylinder and carrying said source, and a spring bearing upon said piston in a direction urging said source out of registry with said windows.

7. The apparatus defined in claim 6 wherein said radiation detectors are ionization chambers.

8. The apparatus defined in claim 7, further comprising respective supports for each of said radiation detectors secured at one end to said fixed part and reaching over said sleeve.

9. The apparatus defined in claim 8, further comprising circuit means connecting said radiation detectors with said adjusting means.

10. The apparatus defined in claim 9, further comprising further circuit means responsive to said radiation detectors for controlling the mass rate off low per unit time of said material through said die.

* * * * *